United States Patent
Swann et al.

(10) Patent No.: US 12,296,470 B2
(45) Date of Patent: May 13, 2025

(54) AUTONOMOUS MOBILE VEHICLE

(71) Applicant: TE Connectivity Services GmbH, Schaffhausen (CH)

(72) Inventors: Anthony L. Swann, Lancaster, PA (US); Swapnilsinh Solanki, Harrisburg, PA (US); Kyle Mongold, Millersburg, PA (US); Jeffrey Zerbe, Bressler, PA (US)

(73) Assignee: TE Connectivity Solutions GmbH (CH)

( * ) Notice: Subject to any disclaimer, the term of this patent is extended or adjusted under 35 U.S.C. 154(b) by 676 days.

(21) Appl. No.: 16/933,011

(22) Filed: Jul. 20, 2020

(65) Prior Publication Data

US 2021/0116923 A1 Apr. 22, 2021

Related U.S. Application Data

(60) Provisional application No. 62/923,877, filed on Oct. 21, 2019.

(51) Int. Cl.
*B25J 5/00* (2006.01)
*B25J 9/16* (2006.01)
*B25J 13/08* (2006.01)

(52) U.S. Cl.
CPC ............... *B25J 5/007* (2013.01); *B25J 9/162* (2013.01); *B25J 9/1674* (2013.01); *B25J 13/086* (2013.01)

(58) Field of Classification Search
CPC ......... G05D 1/0212; B25J 5/007; B25J 9/162; B25J 9/1674; B25J 9/1664; B25J 9/1679; B25J 13/086; B25J 15/00; B60K 1/04; B60K 2007/0046; B60K 7/0007;
(Continued)

(56) References Cited

U.S. PATENT DOCUMENTS

| | | | |
|---|---|---|---|
| 7,501,778 B2* | 3/2009 | Hashimoto | B25J 9/1674 901/1 |
| 10,253,478 B2* | 4/2019 | Matsuzaki | G05D 1/02 |
| 11,453,115 B2* | 9/2022 | Kobari | B25J 19/005 |

(Continued)

FOREIGN PATENT DOCUMENTS

| | | | | |
|---|---|---|---|---|
| CN | 109773764 A | 11/2023 | | |
| DE | 102014012563 B4 * | 10/2018 | ............ | B25J 13/086 |
| JP | 2001096487 A * | 4/2001 | | |

OTHER PUBLICATIONS

First Chinese Office Action, Chinese App. No CN 2020111329588 International Filing Date May 7, 2021.

*Primary Examiner* — Khoi H Tran
*Assistant Examiner* — Nhi Q Bui

(57) ABSTRACT

An autonomous mobile vehicle includes an automatic guided vehicle (AGV), a platform assembly coupled to the AGV, and a collaborative manipulator mounted to a support plate of the platform assembly. A safety sensor is coupled to the collaborative manipulator and includes a first proximity sensor fixed relative to the support plate and a second proximity sensor coupled to the collaborative manipulator proximate to a gripper of the collaborative manipulator and movable with an arm of the collaborative manipulator. The safety sensor determines when the gripper is located at a home position proximate to the support plate by detecting the second proximity sensor in proximity to the first proximity sensor.

20 Claims, 8 Drawing Sheets

(58) Field of Classification Search
CPC ............. B60P 3/00; G05B 2219/40219; G05B 2219/40298; B62D 63/02; B62D 63/04
See application file for complete search history.

(56) References Cited

U.S. PATENT DOCUMENTS

2020/0376656 A1* 12/2020 Berkowitz ............. G05D 1/024
2021/0362341 A1* 11/2021 Cote ..................... B25J 13/087

* cited by examiner

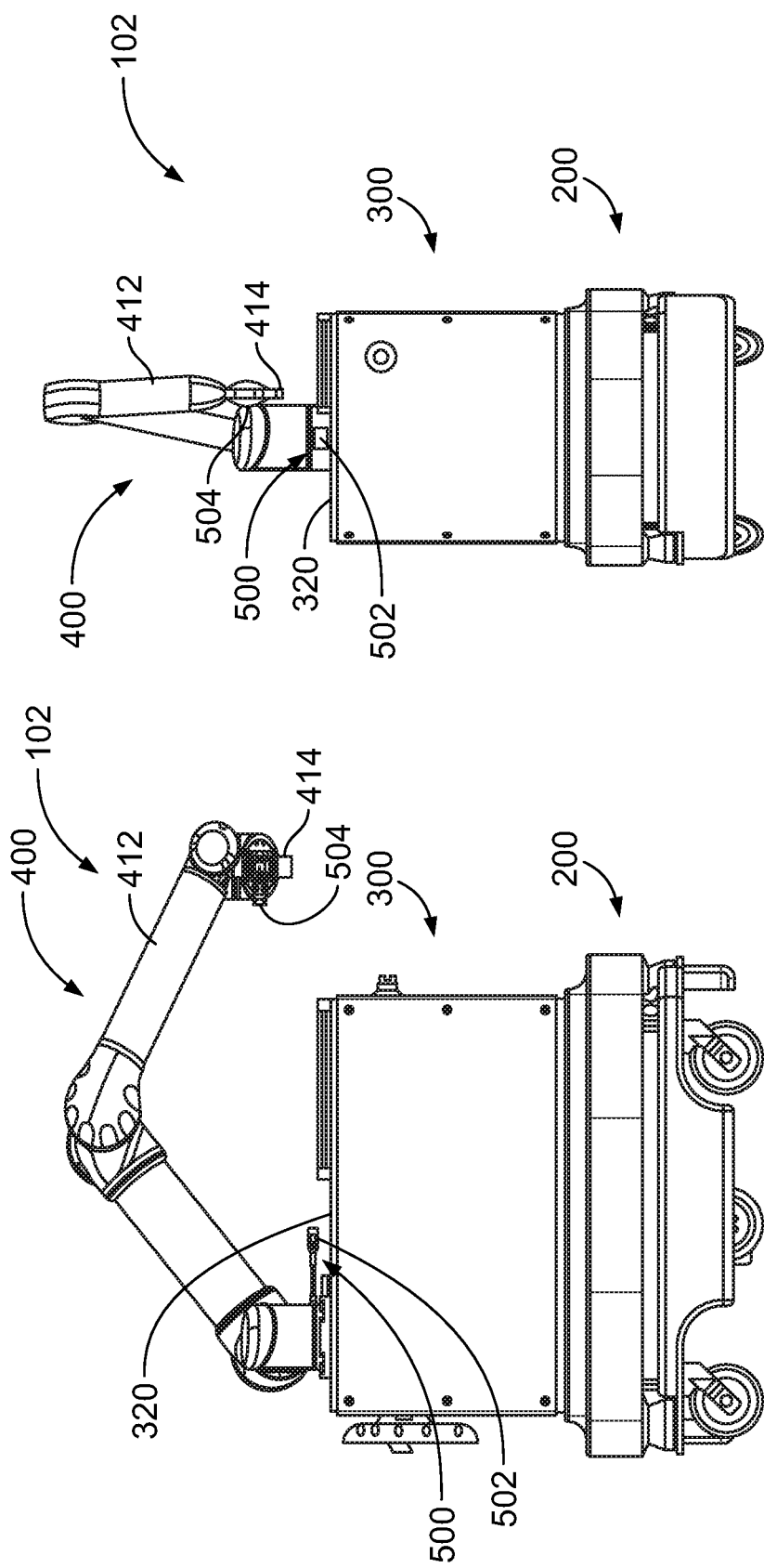

AUTONOMOUS MOBILE VEHICLE

CROSS-REFERENCE TO RELATED APPLICATIONS

This application claims priority to U.S. Provisional Application No. 62/923,877, filed 21 Oct. 2019, titled "AUTONOMOUS MOBILE VEHICLE," which is incorporated by reference herein in its entirety.

BACKGROUND OF THE INVENTION

The subject matter herein relates generally to autonomous mobile vehicles.

AGVs (Automatic Guided Vehicles) are becoming increasingly popular in production facilities to transport parts and materials autonomously from one location to the another one. Production facilities that utilize AGVs typically include a central operator station where an operator processing requests and sends the AGVs to perform the tasks. Such systems typically involve considerable human intervention in the control of the AGVs. Some know production environment have become automated, with the processing machines communicating directly with the AGVs to process requests with no human intervention in the process. However, central control of the AGVs has proven difficult to achieve. Prioritization of machine requests and efficient routing and planning of AGV automation is difficult.

During use, AGVs navigate autonomously from point-to-point and transport materials. However, conventional systems typically require manual assistance while loading and unloading the materials to and from the AGV. Some known AGVs include a collaborative manipulator, such as a robot arm, mounted on top of the AGV to manipulate materials. However, such robot arms have independent control from the control of the AGV. Mounting and integration of the robot arms with the AGV are expensive and unit specific.

A need remains for an autonomous mobile vehicle having a modular platform for use with various types of AGVs and various types of collaborative manipulators.

BRIEF DESCRIPTION OF THE INVENTION

In one embodiment, an autonomous mobile vehicle is provided including an automatic guided vehicle (AGV) having a base, a motor coupled to the base, a wheel driven by the motor for moving the AGV, a battery coupled to the motor to power the motor, and an AGV controller for controlling movement of the AGV. A platform assembly is coupled to the base of the AGV and moved with the AGV. The platform assembly includes a frame holding a collaborative manipulator controller. A collaborative manipulator is operably coupled to the frame. The collaborative manipulator has an arm and a gripper at a distal end of the arm operated to manipulate parts. The collaborative manipulator is operably coupled to the collaborative manipulator controller for controlling operation of the collaborative manipulator. A safety sensor is coupled to the collaborative manipulator and includes a first proximity sensor and a second proximity sensor. The first proximity sensor is fixed relative to the support plate. The second proximity sensor is coupled to the collaborative manipulator proximate to the gripper and movable with the arm and the gripper. The safety sensor determines when the gripper is located at a home position proximate to the support plate by detecting the second proximity sensor in proximity to the first proximity sensor.

In another embodiment, an autonomous mobile vehicle is provided including an automatic guided vehicle (AGV) having a base, a motor coupled to the base, a wheel driven by the motor for moving the AGV, a battery coupled to the motor to power the motor, and an AGV controller for controlling movement of the AGV. A platform assembly is coupled to the base of the AGV and is moved with the AGV. The platform assembly includes a frame having a footprint. The platform assembly includes a collaborative manipulator controller. A collaborative manipulator is operably coupled to the collaborative manipulator controller for controlling operation of the collaborative manipulator. The collaborative manipulator has an arm and a gripper extending from a distal end of the arm being operated to manipulate parts. The collaborative manipulator is movable from a home position to an extended position. The arm is located within the footprint of the frame of the platform assembly in the home position. The gripper is located adjacent the support plate in the home position. The gripper is located remote from the support plate in the extended position. A safety sensor is coupled to the collaborative manipulator. The safety sensor includes a proximity sensor determining when the gripper is located at the home position and determining when the gripper is located in the extended position.

In a further embodiment, a method is provided of operating an autonomous mobile vehicle including an automatic guided vehicle (AGV), a platform assembly having a footprint coupled to the AGV, a collaborative manipulator coupled to the platform assembly, and a safety sensor sensing a proximity of the collaborative manipulator relative to the platform assembly. The method includes determining if the AGV is moving or stationary and determining if the collaborative manipulator is in a safe position or an unsafe position using the safety sensor. The method includes operating the autonomous mobile vehicle in a safe mode if the AGV is moving and the collaborative manipulator is in the safe position. The method includes operating the autonomous mobile vehicle in the safe mode if the AGV is stationary and the collaborative manipulator is in the safe position. The method includes operating the autonomous mobile vehicle in the safe mode if the AGV is stationary and the collaborative manipulator is in the unsafe position. The method includes operating the autonomous mobile vehicle in an unsafe mode if the AGV is moving and the collaborative manipulator is in the unsafe position, wherein the AGV is inoperable in the unsafe mode and wherein the collaborative manipulator is inoperable in the unsafe mode.

BRIEF DESCRIPTION OF THE DRAWINGS

FIG. 8 is a side view of the autonomous mobile vehicle in accordance with an exemplary embodiment showing the collaborative manipulator in a forward extended position.

FIG. 9 is an end view of the autonomous mobile vehicle in accordance with an exemplary embodiment showing the collaborative manipulator in the forward extended position.

DETAILED DESCRIPTION OF THE INVENTION

Figure 1:
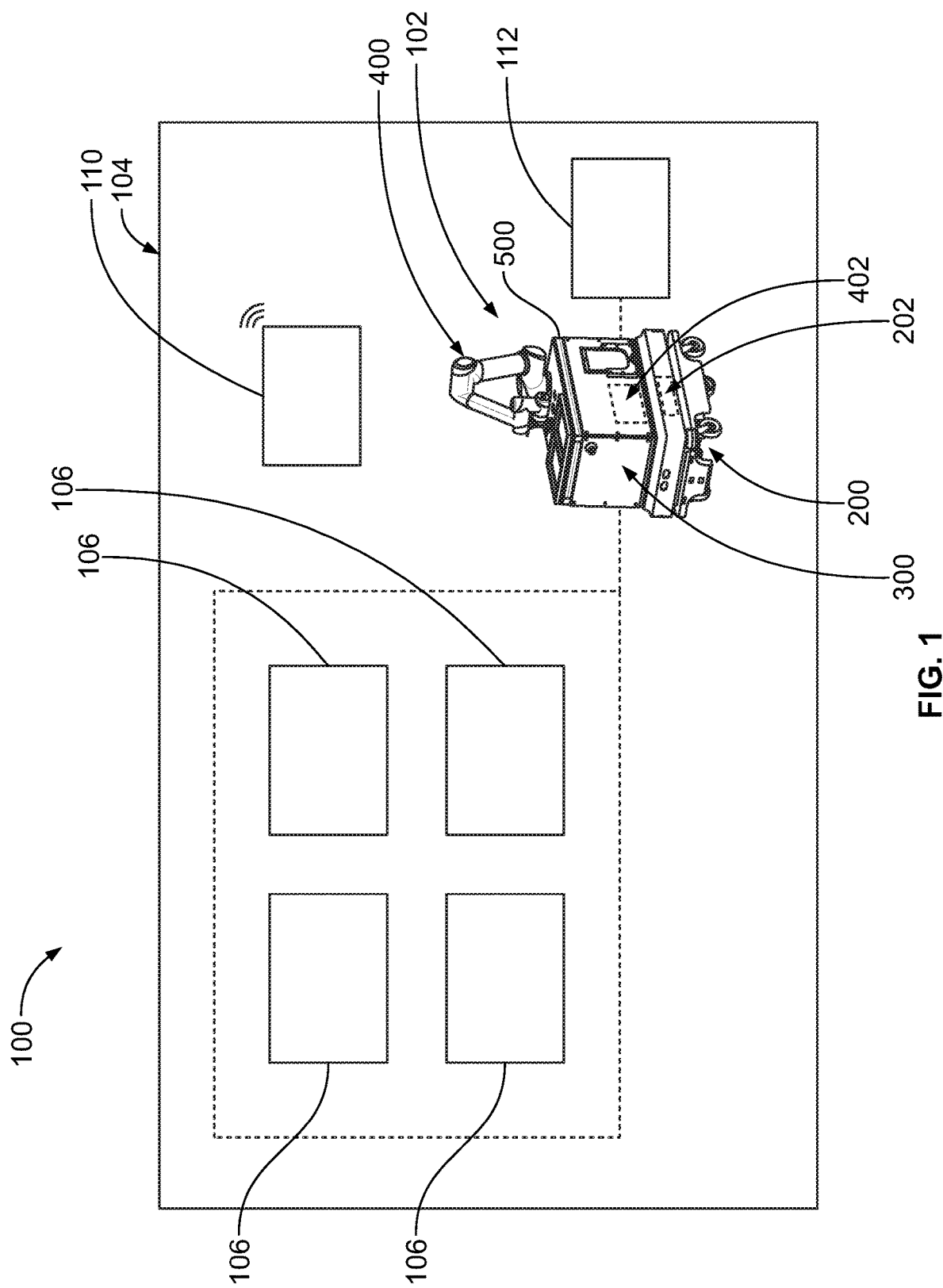
FIG. 1 is a schematic illustration of an autonomous mobile vehicle system in accordance with an exemplary embodiment.

FIG. 1 is a schematic illustration of an autonomous mobile vehicle system 100 in accordance with an exemplary embodiment. The autonomous mobile vehicle system 100 is used to control movements of mobile robots or autonomous mobile vehicles 102 within a logistics facility 104, such as a warehouse, a distribution center, and manufacturing facility, a retail facility, and the like. The autonomous mobile vehicles 102 are used for part picking and part drop-off within the logistics facility 104. For example, the autonomous mobile vehicles 102 are used to pick up parts from one or more machines 106, such as manufacturing machines, storage bins, and the like, and the autonomous mobile vehicles 102 are used to drop off parts at other machines, such as other manufacturing machines, storage bins, and the like.

In an exemplary embodiment, the autonomous mobile vehicle system 100 includes a system control module 110 located within the logistics facility 104. The system control module 110 is communicatively coupled to the machines 106, such as by wired connections or wireless connections. The system control module 110 is communicatively coupled to a plurality of the autonomous mobile vehicles 102 to control part processing within the logistics facility 104, such as movement of the parts between the machines 106 using the autonomous mobile vehicles 102. The autonomous mobile vehicles 102 transports the parts autonomously from one location to another, such as between the machines 106 based on control signals received from the system control module 110.

In an exemplary embodiment, the autonomous mobile vehicle system 100 includes a docking station 112 for the autonomous mobile vehicles 102. The docking station 112 may be used to store and or charge the autonomous mobile vehicles 102. In an exemplary embodiment, the autonomous mobile vehicles 102 return to the docking station 112 after performing one or more tasks to recharge the autonomous mobile vehicles 102.

The autonomous mobile vehicle 102 navigates autonomously from point-to-point within the logistics facility 104, such as to pick up parts, drop off parts, inventory parts, or return to the docking station 112. For example, the autonomous mobile vehicle 102 moves along one or more paths through the logistics facility 104 between the docking station 112 and the machines 106. The autonomous mobile vehicle 102 includes an automatic guided vehicle (AGV) 200, a platform assembly 300 mounted to the AGV 200, a collaborative manipulator 400 mounted to the platform assembly 300, and a safety sensor 500 for detecting a position of the collaborative manipulator 400. The AGV 200 is used to move the autonomous mobile vehicle 102 around the logistics facility 104. The collaborative manipulator 400 is used for manipulating the parts at the machines 106. For example, the collaborative manipulator 400 may include a robot arm and/or a gripper and/or a conveyor in various embodiments. Other types of part manipulators may be utilized in alternative embodiments. The platform assembly 300 provides a mechanical and electrical connection between the AGV 200 and the collaborative manipulator 400. The platform assembly 300 may be modular and/or scalable for mounting to different types of AGVs 200 and/or for mounting different types of collaborative manipulators 400. The AGV 200 includes an AGV controller 202 for controlling operation of the AGV 200. The platform assembly 300 includes a collaborative manipulator controller 402 for the collaborative manipulator 400.

The safety sensor 500 is used to ensure that the collaborative manipulator 400 is in a safe position when moving around the logistics facility 104. For example, the safety sensor 500 detects the presence of the collaborative manipulator 400 in a home position (for example, near the platform assembly 300 within a footprint of the platform assembly 300) allowing normal operation of the AGV 200. The AGV 200 is able to move around the logistics facility 104 when the collaborative manipulator 400 is in the safe position. However, when the collaborative manipulator 400 is extended and moved out of the home position, the collaborative manipulator 400 is in an unsafe position. The safety sensor 500 does not detect the collaborative manipulator 400 when in the unsafe position. Because it may be unsafe to move the autonomous mobile vehicle 102 when the collaborative manipulator 400 is in the unsafe position, the AGV 200 and/or the collaborative manipulator 400 are shut down and unable to move.

Figure 2:
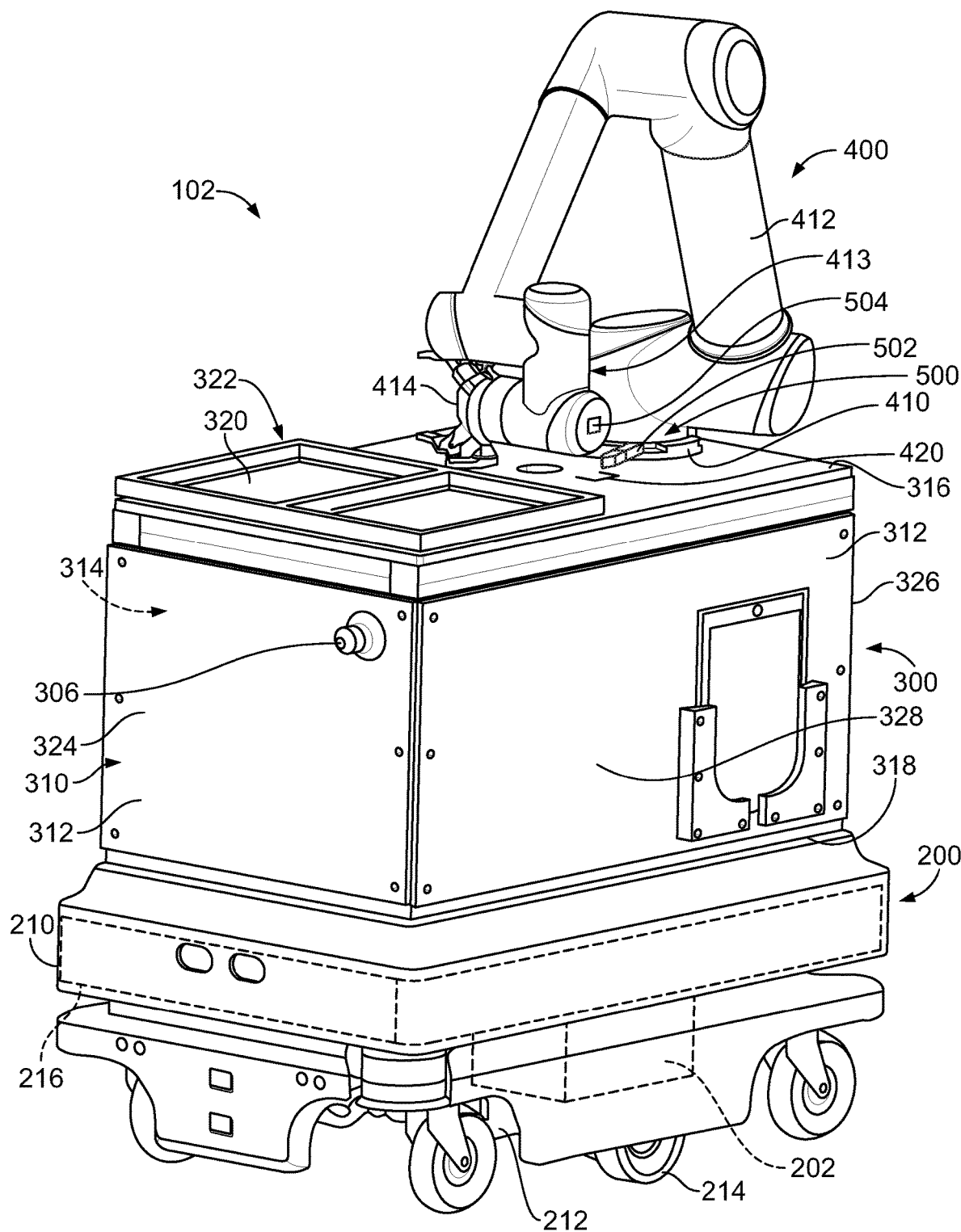
FIG. 2 is a front perspective view of an autonomous mobile vehicle in accordance with an exemplary embodiment.

FIG. 2 is a front perspective view of the autonomous mobile vehicle 102 in accordance with an exemplary embodiment. FIG. 2 illustrates the platform assembly 300 mounted to the AGV 200 and illustrates the collaborative manipulator 400 mounted to the platform assembly 300. The safety sensor 500 is mounted to the platform assembly 300 and/or the collaborative manipulator 400. The safety sensor determines the position of the collaborative manipulator 400 relative to the platform assembly 300, such as to determine if the collaborative manipulator 400 is in a safe position or an unsafe position.

The AGV 200 includes a base 210 housing a motor 212 and wheels 214 driven by the motor 212 from moving the AGV 200. The base 210 has a footprint (for example, length and width) and other components of the AGV 200 are contained within the footprint of the base 210. The AGV 200 includes a battery 216 coupled to the motor 212 to power the motor 212. In an exemplary embodiment, the AGV controller 202 controls movement of the AGV 200. The AGV controller 202 is operably coupled to the motor 212. The AGV controller 202 controls operation of the motor 212 to move the AGV 200. The AGV controller 202 may control an ON/OFF mode of the motor 212, may control an operating speed of the motor 212, may control an operating direction of the motor 212, and the like. For example, during a normal operating mode, the AGV controller 202 may allow the motor 212 to turn on, may control the speed of the motor 212, and may control the direction of the motor 212 to allow the AGV 200 to move around the logistics facility 104. During a safety mode, the AGV controller 202 may shut down the motor 212 and restrict operation of the motor 212 to restrict movement of the AGV 200. For example, when the collaborative manipulator 400 is in an extended position, it may be unsafe to move the autonomous mobile vehicle 102 around the logistics facility 104. Thus, the AGV controller 202 may change to the safe mode to stop movement of the AGV 200 when the collaborative manipulator 400 is in the extended position (for example, the collaborative manipulator is not detected in the home position by the safety sensor 500). The AGV controller 202 is communicatively coupled to the system control module 110 (shown in FIG. 1) to receive control signals for operating the AGV 200. For example, the AGV controller 202 may receive route information to guide the AGV 200 along a particular path, such as between the docking station 112 and the machines 106 (shown in FIG. 1). The AGV controller 202 may receive information instructing the AGV 200 to stop, to move forward, to move rearward, and/or to turn right or left for controlling movement of the AGV 200.

The platform assembly 300 includes a frame 310 having walls 312 enclosing a cavity 314. The walls 312 extend between a top 316 and a bottom 318 of the frame 310. The bottom 318 of the frame 310 is mounted to the base 210 of the AGV 200. The frame 310 has a footprint (for example, length and width) and other components of the platform assembly 300 are contained within the footprint of the frame 310. The bottom 318 may define the footprint. However, the top 316 or another location of the frame 310 may define the largest dimension of the platform assembly 300, and thus define the footprint. The footprint of the platform assembly 300 may be smaller than the footprint of the AGV 200 in various embodiments; however, the footprint of the platform assembly 300 may be equal to or larger than the footprint of the AGV 200 in other various embodiments. The platform assembly 300 is moved with the AGV 200. In an exemplary embodiment, the platform assembly 300 includes a button 306 on one of the walls 312 that may be used to reset operation or stop operation of the AGV 200 and/or the collaborative manipulator 400. Optionally, one or more of the walls 312 may include vents for air circulation through the cavity 314.

The platform assembly 300 includes a support plate 320 at the top 316. The support plate 320 supports the collaborative manipulator 400. For example, the collaborative manipulator 400 may be mounted directly to the support plate 320, such as using fasteners. In an exemplary embodiment, the support plate 320 includes a plurality of mounting locations for mounting the collaborative manipulator 400 at different locations on the support plate 320 and/or for mounting different types of collaborative manipulators on the support plate 320. In an exemplary embodiment, the platform assembly 300 includes a part holder 322 at the top of the support plate 320. The part holder 322 may include rails or walls forming a space to receive and retain the parts on the support plate 320 during transport, such as between the machines 106. In the illustrated embodiment, the part holder 322 is located proximate to a front 324 of the platform assembly 300. However, the part holder 322 may be located at other locations, such as proximate to a rear 326 of the platform assembly 300 and or the sides 328 of the platform assembly 300.

In an exemplary embodiment, the collaborative manipulator 400 includes a mounting base 410 that is mounted to the support plate 320, such as using fasteners. In the illustrated embodiment, the collaborative manipulator 400 is mounted proximate to the rear 326 of the platform assembly 300. Other mounting locations are possible in alternative embodiments. The mounting base 410 fixes the collaborative manipulator 400 relative to the platform assembly 300. In an exemplary embodiment, the collaborative manipulator 400 includes an arm 412 and a gripper 414 at a distal end 413 of the arm 412 used for picking up the parts and moving the parts to or from the part holder 322. The arm 412 may be a four-axis manipulating arm or a six-axis manipulating arm in various embodiments. Other types of robot arms may be used in alternative embodiments. In other various embodiments, other types of part manipulators may be utilized rather than the gripper 414 and/or the arm 412. For example, the collaborative manipulator 400 may include a conveyor, a stack light, or other type of manipulator.

The safety sensor 500 is coupled to the platform assembly 300 and/or the collaborative manipulator 400. The safety sensor 500 determines (e.g., senses) when the gripper 414 of the collaborative manipulator 400 is in the home position. In an exemplary embodiment, the safety sensor 500 includes a proximity sensor for detecting presence of an object or target or sensor component within a predetermined range or target zone. When the presence of such object or target or sensor component is undetected, the safety sensor determines that the gripper 414 is outside of the home position and thus the collaborative is in an extended and unsafe position. In an exemplary embodiment, the safety sensor 500 includes a first proximity sensor 502 and a second proximity sensor 504. The safety sensor 500 may include additional sensor elements in alternative embodiments. The first proximity sensor 502 is fixed relative to the support plate 320. For example, the first proximity sensor 502 may be coupled to the support plate 320 or the mounting base 410 of the collaborative manipulator 400. The first proximity sensor 502 may be located proximate to the home location of the gripper 414 and sense presence of the second proximity sensor 504, and thus the gripper 414, at the home location. The second proximity sensor 504 is movable relative to the support plate 320 and the first proximity sensor 502. For example, the second proximity sensor 504 may be coupled to the collaborative manipulator 400 and movable with the collaborative manipulator 400. In various embodiments, the second proximity sensor 504 may be mounted proximate to the gripper 414, such as directly to the gripper 414 or to the arm 412 proximate to the distal end 413 of the arm 412.

Figure 3:
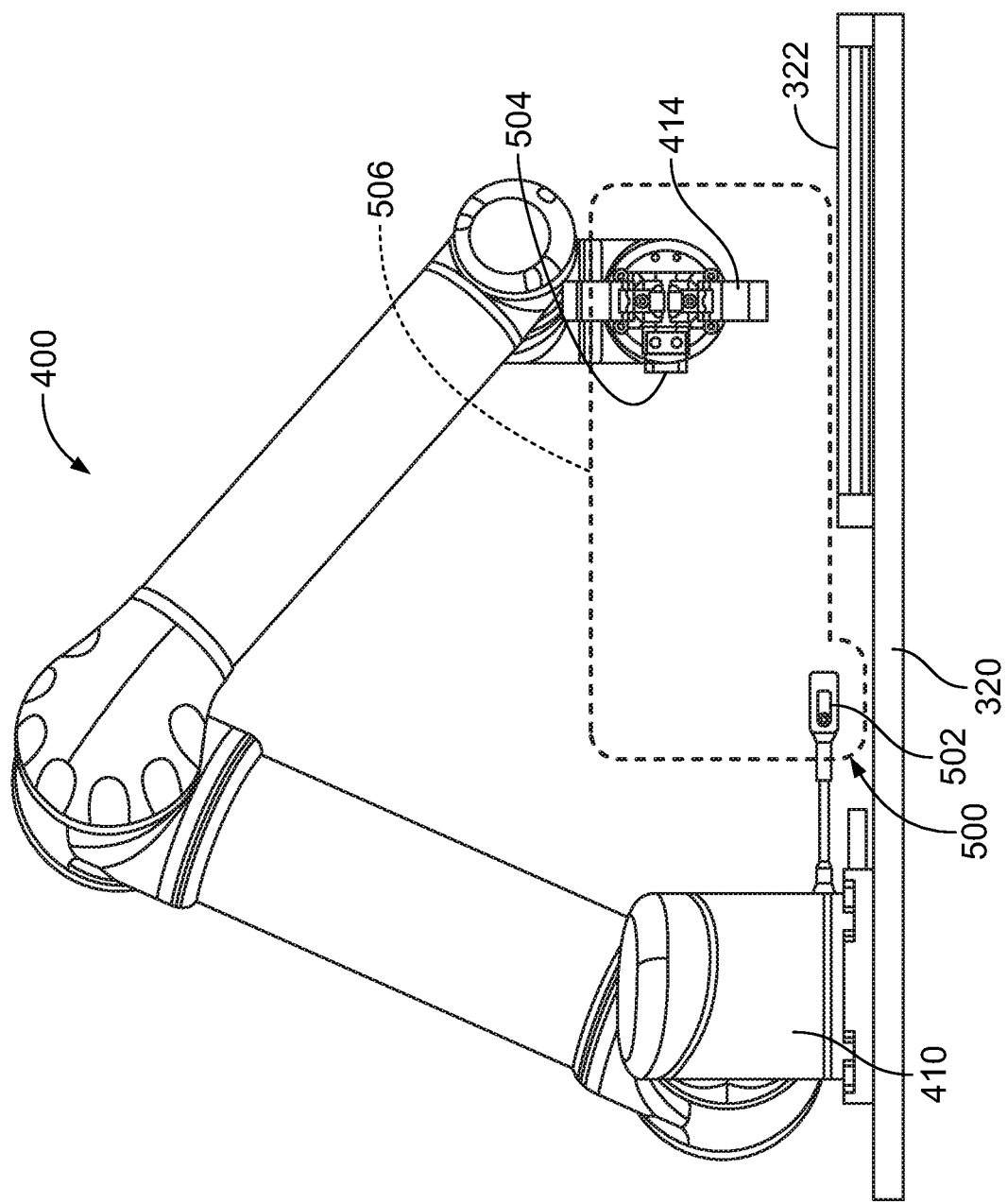
FIG. 3 is an enlarged view of a portion of the autonomous mobile vehicle in accordance with an exemplary embodiment showing a safety sensor coupled to a collaborative manipulator.

FIG. 3 is an enlarged view of a portion of the autonomous mobile vehicle 102 in accordance with an exemplary embodiment showing the safety sensor 500 coupled to the collaborative manipulator 400. The first proximity sensor 502 is shown coupled to the mounting base 410 and fixed relative to the support plate 320. The first proximity sensor 502 is located proximate to the support plate 320. The first proximity sensor 502 may be located proximate to the part holder 322. The first proximity sensor 502 does not move as the collaborative manipulator 400 is moved. The second proximity sensor 504 is shown coupled to the gripper 414. The second proximity sensor 504 is movable with the gripper 414 relative to the support plate 320 and the first proximity sensor 502. Other mounting locations are possible in alternative embodiments.

In an exemplary embodiment, the first proximity sensor 502 is a sensing element and the second proximity sensor 504 is a target element. In various embodiments, the first proximity sensor 502 may be a transmitter, a receiver or a transceiver. The first proximity sensor 502 may be a contactless sensor. In various embodiments, the first proximity sensor 502 is an RF sensor element. The first proximity sensor 502 may be an inductive sensor, a capacitive sensor, a photoelectric sensor, a through-beam sensor, a retro-reflective sensor, an ultrasonic sensor, and the like. The first proximity sensor 502 is configured to sense the presence or absence of the second proximity sensor 504 within a target zone 506 of the first proximity sensor 502. The target zone 506 is an area within a predetermined distance of the first proximity sensor 502. The target zone 506 may be directional or omnidirectional relative to the first proximity sensor 502. The second proximity sensor 504 may be a contactless sensor. In various embodiments, the second proximity sensor 504 may be magnetic or non-magnetic.

Figure 5:
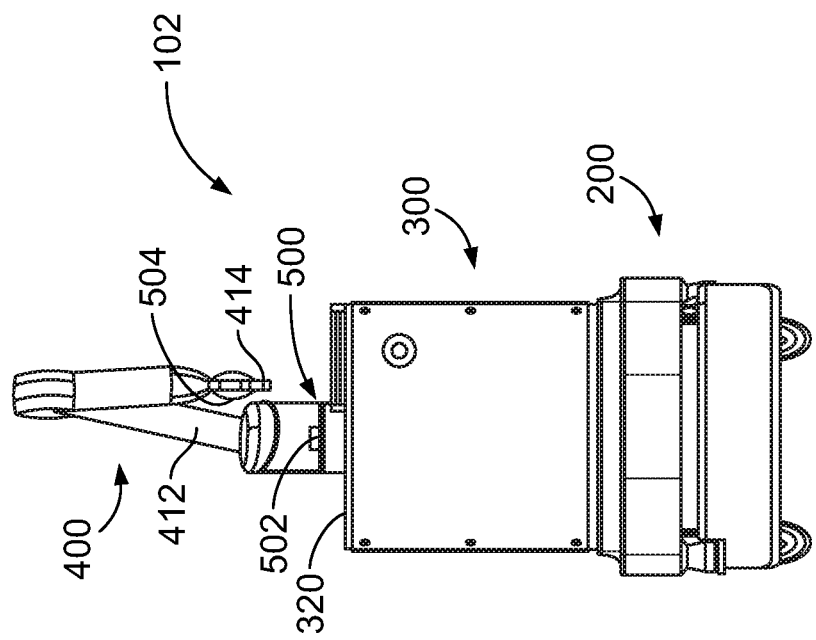
FIG. 5 is an end view of the autonomous mobile vehicle in accordance with an exemplary embodiment showing the collaborative manipulator in the home position.
Figure 4:
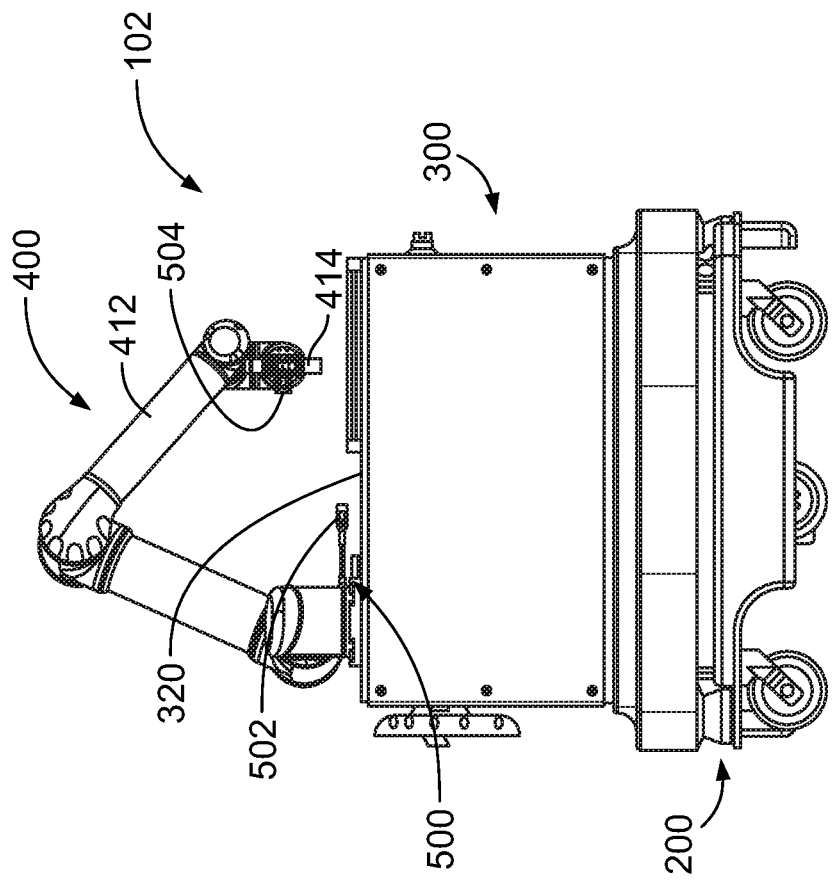
FIG. 4 is a side view of the autonomous mobile vehicle in accordance with an exemplary embodiment showing the collaborative manipulator in a home position.
Figure 7:
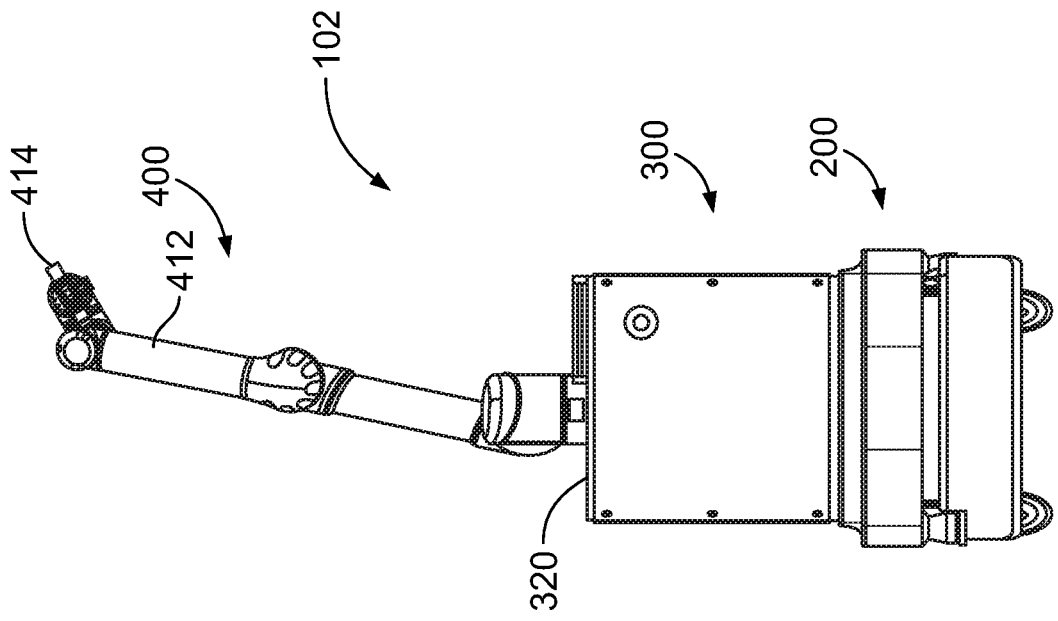
FIG. 7 is an end view of the autonomous mobile vehicle in accordance with an exemplary embodiment showing the collaborative manipulator in the upward extended position.
Figure 6:
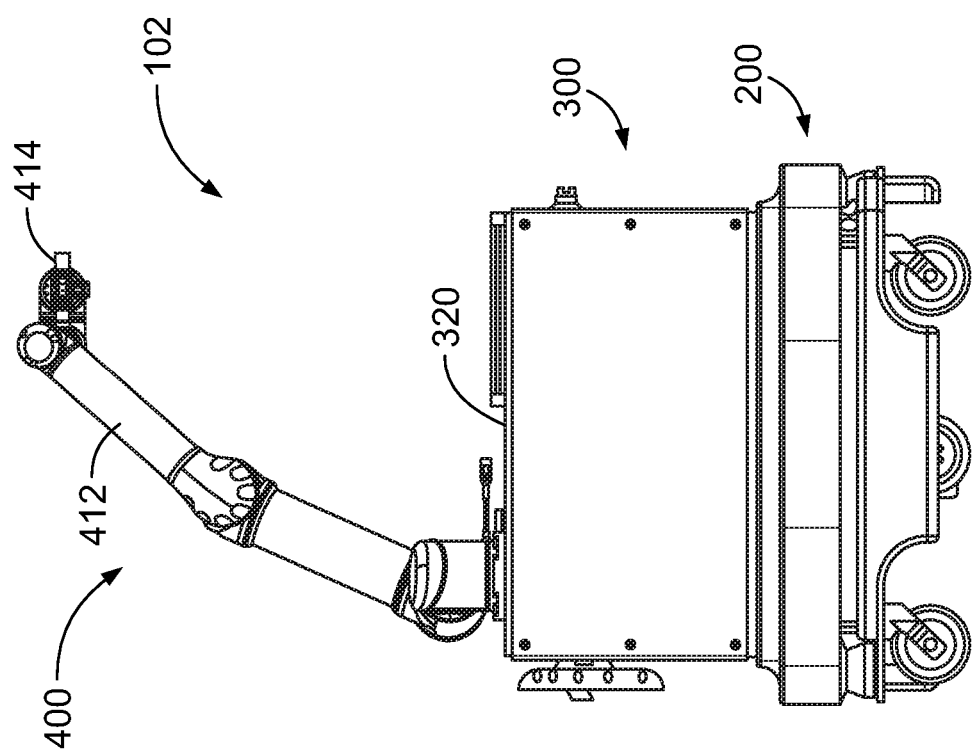
FIG. 6 is a side view of the autonomous mobile vehicle in accordance with an exemplary embodiment showing the collaborative manipulator in an upward extended position.
Figure 11:
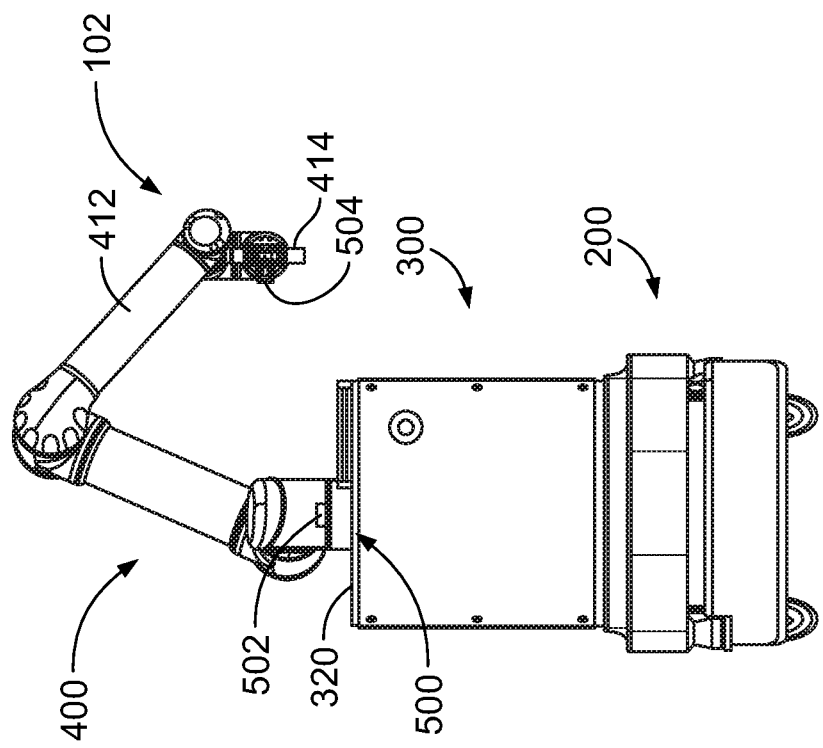
FIG. 11 is an end view of the autonomous mobile vehicle in accordance with an exemplary embodiment showing the collaborative manipulator in the sideways extended position.
Figure 10:
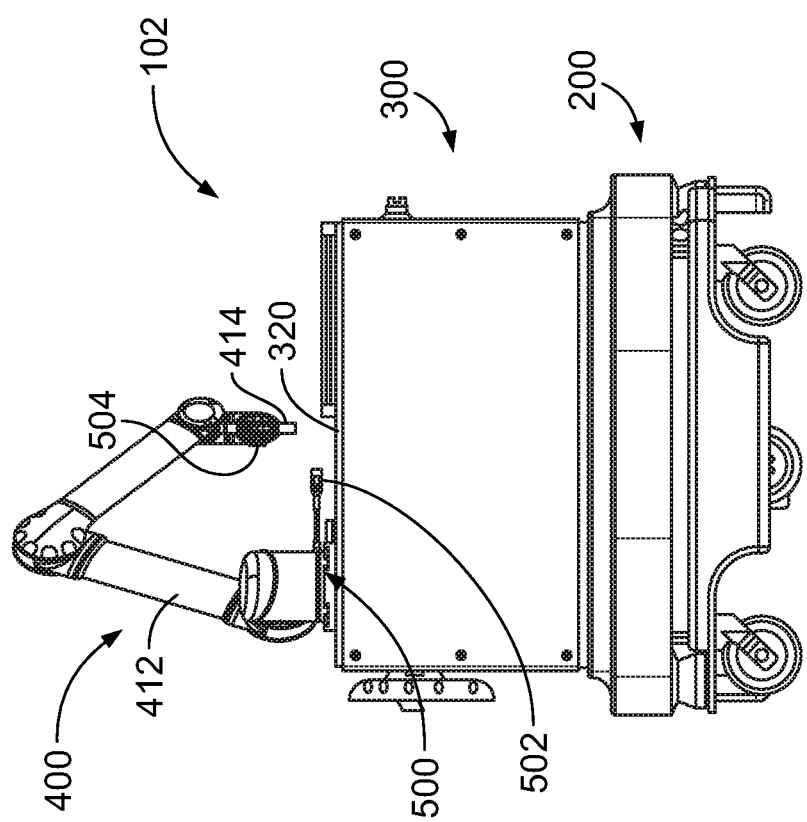
FIG. 10 is a side view of the autonomous mobile vehicle in accordance with an exemplary embodiment showing the collaborative manipulator in a sideways extended position.

FIG. 4 is a side view of the autonomous mobile vehicle 102 in accordance with an exemplary embodiment showing the collaborative manipulator 400 in a home position. FIG. 5 is an end view of the autonomous mobile vehicle 102 in accordance with an exemplary embodiment showing the collaborative manipulator 400 in the home position. FIG. 6 is a side view of the autonomous mobile vehicle 102 in accordance with an exemplary embodiment showing the collaborative manipulator 400 in an extended position, such as an upward extended position. FIG. 7 is an end view of the autonomous mobile vehicle 102 in accordance with an exemplary embodiment showing the collaborative manipulator 400 in the extended position, such as the upward extended position. FIG. 8 is a side view of the autonomous mobile vehicle 102 in accordance with an exemplary embodiment showing the collaborative manipulator 400 in an extended position, such as a forward extended position. FIG. 9 is an end view of the autonomous mobile vehicle 102 in accordance with an exemplary embodiment showing the collaborative manipulator 400 in the extended position, such as the forward extended position. FIG. 10 is a side view of the autonomous mobile vehicle 102 in accordance with an exemplary embodiment showing the collaborative manipulator 400 in an extended position, such as a sideways extended position. FIG. 11 is an end view of the autonomous mobile vehicle 102 in accordance with an exemplary embodiment showing the collaborative manipulator 400 in the extended position, such as the sideways extended position.

During use, the collaborative manipulator 400 is moved from the home position (FIGS. 4 and 5) to various extended positions, such as for picking and placing parts to and from the machines 106. In the extended positions, the gripper 414 and the arm 412 are moved away from the support plate 320. It may be unsafe to operate the autonomous mobile vehicle 102 when the gripper 414 and the arm 412 are in the extended positions. The gripper 414 and the arm 412 may be located outside of the footprint of the platform assembly 300 in various extended positions (see, for example, FIGS. 8-11). For example, the gripper 414 and the arm 412 may be located forward or rearward of the platform assembly 300 (FIGS. 8-9) and/or the gripper 414 and the arm 412 may be located to the right side or to the left side of the platform assembly 300 (FIGS. 10-11). However, the gripper 414 and the arm 412 may be located within the footprint of the platform assembly 300 in various extended positions (see, for example, FIGS. 6-7).

The safety sensor 500 is used to detect when the collaborative manipulator 400 is in the home position and when the collaborative manipulator 400 is away from the home position, and thus in the extended position. In the home position, the second proximity sensor 504 is located close to the first proximity sensor 502 within the target zone 506. In an exemplary embodiment, it is safe to operate the AGV 200 and move the autonomous mobile vehicle 102 around the logistics facility 104 when the collaborative manipulator 400 is in the home position. For example, the gripper 414 and the arm 412 are within the footprint of the platform assembly 300. However, in the extended positions, the second proximity sensor 504 is located remote from the first proximity sensor 502 outside of the target zone 506. In an exemplary embodiment, the autonomous mobile vehicle 102 is shut down when the AGV 200 attempts to move and the collaborative manipulator 400 is in an extended position. In the extended positions, it may be unsafe to move the autonomous mobile vehicle 102. For example, the collaborative manipulator 400 may be damaged if the autonomous mobile vehicle 102 were to impact one of the machines 106 or other structures within the logistics facility 104. Additionally, the collaborative manipulator 400 may damage the machines 106 or other structures within the logistics facility 104 or may injure personnel within the logistics facility 104 when the collaborative manipulator 400 is in the extended position.

Figure 12:
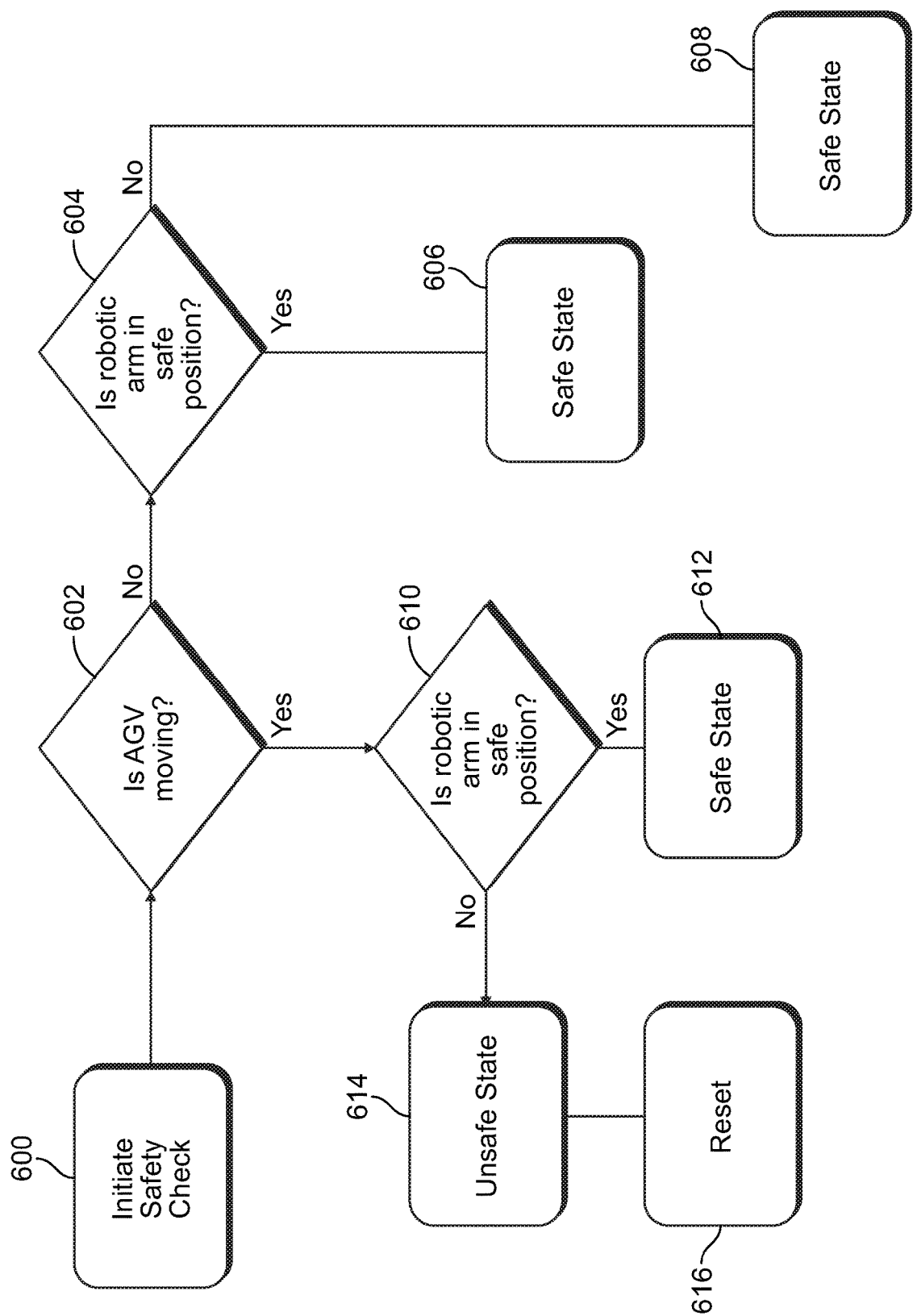
FIG. 12 is a flow chart of a method of operating the autonomous mobile vehicle in accordance with an exemplary embodiment.

FIG. 12 is a flow chart of a method of operating an autonomous mobile vehicle 102 in accordance with an exemplary embodiment. At 600, a safety check is initiated. The safety check may be initiated manually, such as by turning the autonomous mobile vehicle 102 on or by pressing a button on the autonomous mobile vehicle 102. The safety check may be initiated automatically, such as a routine safety check performed periodically by the autonomous mobile vehicle 102 when the autonomous mobile vehicle 102 is operational. For example, the safety check may be performed every M seconds or multiple times per second, such as every N milliseconds.

At 602, the autonomous mobile vehicle 102 determines if the AGV 200 is moving or if the AGV 200 is stationary (not moving). In an exemplary embodiment, the AGV controller 202 controls and monitors operation of the AGV 200, such as operation of the motor 212 of the AGV 200. For example, the AGV controller 202 may control power supply to the motor 212. When the power is being supplied to the motor 212, the AGV 200 is moving. When the power is not supplied to the motor 212, the AGV 200 is stationary. If the AGV 200 is stationary, the autonomous mobile vehicle 102 is operable in a safe state. The collaborative manipulator 400 may be operated when the autonomous mobile vehicle 102 is in the safe state. The collaborative manipulator 400 may be used to pick and place parts when operated in the safe state.

If the AGV 200 is stationary, at 604, the autonomous mobile vehicle 102 determines if the collaborative manipulator 400 is in a safe position. The autonomous mobile vehicle 102 may make continuous or periodic determinations of the position of the collaborative manipulator 400. In various embodiments, if the AGV 200 receives a move command, the autonomous mobile vehicle 102 may determine if the collaborative manipulator 400 is in a safe position prior to allowing the AGV 200 to move. In an exemplary embodiment, the safety sensor 500 determines if the collaborative manipulator 400 is in the home position. For example, the safety sensor 500 determines if the gripper 414 is within a proximity or range of the safety sensor 500. The safety sensor 500 determines if the second proximity sensor 504 is within a proximity or range of the first proximity sensor 502. When the presence of the second proximity sensor 504 is detected, the safety sensor 500 makes the determination that the collaborative manipulator 400 is in the home position, and thus in a safe position. For example, the gripper 414 and the arm 412 are within the footprint of the platform assembly 300 in a condensed or consolidated state. When the absence of the second proximity sensor 504 is detected (for example, the second proximity sensor is not detected), the safety sensor 500 makes the determination that the collaborative manipulator 400 is in an extended position, and thus in an unsafe position. For example, the gripper 414 and/or the arm 412 may be located outside of the footprint of the platform assembly 300, and thus may be damaged or may damage other components or injure personnel if the AGV 200 were to move. In an exemplary embodiment, the safety sensor 500 determines if the gripper 414 and the arm 412 are within the footprint of the platform assembly 300. If the gripper 414 and the arm 412 are within the footprint of the platform assembly, the safety sensor 500 makes a determination that the collaborative manipulator 400 is in a safe position (for example, in the home position). For example, the safety sensor 500 may include proximity sensors to determine positions of the gripper 414 and the arm 412 relative to the safety sensor 500 and/or the overall structure of the AGV 200. When the gripper 414 and the arm 412 are at a safe position, as detected by the safety sensor 500, the safe position determination is made. The safety sensor 500 may generate a safe position signal when the gripper 414 and the arm 412 are in the safe position. The safe position signal may be transmitted to the AGV controller 202 to control other operations of the AGV 200. If the gripper 414 and the arm 412 are outside of the footprint of the platform assembly, the safety sensor 500 makes a determination that the collaborative manipulator 400 is in an unsafe position (for example, in an extended position). For example, if the position of the gripper 414 and the arm 412 is outside of (for example, beyond) a safe proximity or distance from the proximity sensor, the safety sensor 500 makes a determination that the collaborative manipulator 400 is in an unsafe position. The safety sensor 500 may generate an unsafe position signal when the gripper 414 and the arm 412 are in the unsafe position. The unsafe position signal may be transmitted to the AGV controller 202 to limit or reduce other control operations of the AGV 200. For example, the AGV 200 may be unable to move when the gripper 414 and the arm 412 are in the unsafe position.

If the AGV 200 is stationary and the collaborative manipulator 400 is in the safe position, the autonomous mobile vehicle 102 is operated in a safe state at 606. The autonomous mobile vehicle 102 may continue to operate and perform tasks or routines within the queue. For example, the collaborative manipulator 400 may be operated when the autonomous mobile vehicle 102 is in the safe state. The collaborative manipulator 400 may be used to pick and place parts when operated in the safe state.

If the AGV 200 is stationary and the collaborative manipulator 400 is in the unsafe position, the autonomous mobile vehicle 102 is operated in a safe state at 608. The autonomous mobile vehicle 102 may continue to operate and perform tasks or routines within the queue. For example, when the AGV 200 is stationary, the collaborative manipulator 400 may be operated because the autonomous mobile vehicle 102 is in the safe state. The collaborative manipulator 400 may be used to pick and place parts when operated in the safe state. The collaborative manipulator 400 may move to the unsafe position when the AGV 200 is stationary, and thus in a safe state.

While the AGV 200 is moving, at 610, the autonomous mobile vehicle 102 may make continuous or periodic determination that the collaborative manipulator 400 is in a safe position. In an exemplary embodiment, the safety sensor 500 determines if the collaborative manipulator 400 is in the home position. For example, the safety sensor 500 determines if the gripper 414 is within a proximity or range of the safety sensor 500. The safety sensor 500 determines if the second proximity sensor 504 is within a proximity or range of the first proximity sensor 502. When the presence of the second proximity sensor 504 is detected, the safety sensor 500 makes the determination that the collaborative manipulator 400 is in the home position, and thus in a safe position. For example, the gripper 414 and the arm 412 are within the footprint of the platform assembly 300 in a condensed or consolidated state. When the absence of the second proximity sensor 504 is detected (for example, the second proximity sensor is not detected), the safety sensor 500 makes the determination that the collaborative manipulator 400 is in an extended position, and thus in an unsafe position. For example, the gripper 414 and/or the arm 412 may be located outside of the footprint of the platform assembly 300, and thus may be damaged or may damage other components or injure personnel if the AGV 200 were to move. In an exemplary embodiment, the safety sensor 500 determines if the gripper 414 and the arm 412 are within the footprint of the platform assembly 300. If the gripper 414 and the arm 412 are within the footprint of the platform assembly, the safety sensor 500 makes a determination that the collaborative manipulator 400 is in a safe position (for example, in the home position). If the gripper 414 and the arm 412 are outside of the footprint of the platform assembly, the safety sensor 500 makes a determination that the collaborative manipulator 400 is in an unsafe position (for example, in an extended position).

If the AGV 200 is moving and the collaborative manipulator 400 is in the safe position (for example, the home position), the autonomous mobile vehicle 102 is operated in a safe state at 612. The autonomous mobile vehicle 102 may continue to operate and perform tasks or routines within the queue. For example, the AGV 200 may be operated to move the parts between machines or move to the docking station.

If the AGV 200 is moving and the collaborative manipulator 400 is in the unsafe position, the autonomous mobile vehicle 102 is in an unsafe state at 614. The AGV 200 needs to be shut down or powered down to stop moving if the collaborative manipulator 400 is determined to be in the unsafe position. The collaborative manipulator 400 may be damaged or may damage other components or injure personnel if the AGV 200 were to move and the collaborative manipulator 400 were in the extended state. For example, the collaborative manipulator 400 may impact one of the machines 106 or other structures within the logistics facility 104, which could damage the collaborative manipulator 400. The collaborative manipulator 400 may damage the machines 106 or other structures within the logistics facility 104 or may injure personnel within the logistics facility 104 when the AGV 200 is moving and the collaborative manipulator 400 is in the extended position. When the collaborative manipulator 400 is determined to be in the unsafe position, an unsafe position signal is transmitted to the AGV controller 202 to shut off power or otherwise cause the AGV 200 to stop moving. In the unsafe state, the autonomous mobile vehicle 102 is shut down and inoperable. The AGV 200 is shut off and stationary in the unsafe state. Power is removed from the motor 212 such that the AGV 200 is immobile. The collaborative manipulator 400 is shut off and stationary in the unsafe state. Power is removed from the collaborative manipulator such that the arm 412 and the gripper 414 do not move. The power to the motor 212 may be shut off manually by an operator, either on the AGV 200 itself or from a remote control location, if an unsafe signal is received.

After the autonomous mobile vehicle 102 is shut down, the autonomous mobile vehicle 102 is reset at 616. In an exemplary embodiment, the autonomous mobile vehicle 102 is manually reset. For example, the collaborative manipulator 400 is manually reset by moving the collaborative manipulator 400 to the home position. The arm 412 and the gripper 414 may be moved to the condensed or consolidated position close to the support plate 320 within the footprint of the platform assembly 300. The autonomous mobile vehicle 102 may be reset by pressing a reset button on the autonomous mobile vehicle 102.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An autonomous mobile vehicle comprising:
   an automatic guided vehicle (AGV) having a base, a motor coupled to the base, a wheel driven by the motor for moving the AGV, a battery coupled to the motor to power the motor, and an AGV controller for controlling movement of the AGV;
   a platform assembly coupled to the base of the AGV and moved with the AGV, the platform assembly including a frame, the frame having sides extending between a top and a bottom defining a footprint of the platform assembly, the platform assembly including a collaborative manipulator controller;
   a collaborative manipulator operably coupled to the collaborative manipulator controller, the collaborative manipulator having a movable arm and a gripper at a distal end of the arm being operated to manipulate parts, the collaborative manipulator mounted to a support plate of the platform assembly at the top of the frame; and
   a safety sensor including a first proximity sensor and a second proximity sensor, the first proximity sensor being fixed relative to the frame remote from the collaborative manipulator at a home position at the top of the frame within the footprint, the second proximity sensor being coupled to the collaborative manipulator proximate to the gripper and being movable with the arm and the gripper, the safety sensor determining when the gripper is located at the home position relative to the frame proximate to the support plate within the footprint of the platform assembly by detecting the second proximity sensor in proximity to the frame by determining that the second proximity sensor is in proximity to the first proximity sensor, which is fixed to the frame at the home position.

2. The autonomous mobile vehicle of claim 1, wherein the AGV and the collaborative manipulator are shut down if the AGV is moving and the gripper is not detected in the home position by the safety sensor.

3. The autonomous mobile vehicle of claim 1, wherein the gripper is located within a footprint of the platform assembly in the home position, and wherein the arm is located within the footprint of the platform assembly in the home position.

4. The autonomous mobile vehicle of claim 1, wherein the first proximity sensor is coupled to one of the mounting base of the collaborative manipulator or the support plate of the platform assembly and held in a fixed position relative to the support plate, and wherein the second proximity sensor is coupled to one of the arm or the gripper and is movable relative to the support plate and relative to the first proximity sensor.

5. The autonomous mobile vehicle of claim 1, wherein the collaborative manipulator is in a safe position when the gripper is detected by the safety sensor in the home position, the collaborative manipulator being in an unsafe position when the gripper is undetected by the safety sensor.

6. The autonomous mobile vehicle of claim 5, wherein the AGV is inoperable when the collaborative manipulator is in the unsafe position.

7. The autonomous mobile vehicle of claim 5, wherein the AGV controller determines if the AGV is moving, the AGV controller shutting down the AGV if the AGV is moving and the collaborative manipulator is in the unsafe position.

8. The autonomous mobile vehicle of claim 5, wherein the AGV controller determines if the AGV is moving, the AGV allowing normal operation of the AGV if the AGV is moving and the collaborative manipulator is in the safe position.

9. The autonomous mobile vehicle of claim 5, wherein the AGV controller determines if the AGV is moving, the collaborative manipulator controller allowing normal operation of the collaborative manipulator if the AGV is stationary.

10. The autonomous mobile vehicle of claim 1, wherein the first proximity sensor is a non-contact sensor, the second proximity sensor being a target sensor, the non-contact sensor determining proximity of the target sensor within a predetermined range of the non-contact sensor.

11. An autonomous mobile vehicle comprising:
    an automatic guided vehicle (AGV) having a base, a motor coupled to the base, a wheel driven by the motor for moving the AGV, a battery coupled to the motor to power the motor, and an AGV controller for controlling movement of the AGV;
    a platform assembly coupled to the base of the AGV and moved with the AGV, the platform assembly including a frame having sides extending between a top and a bottom defining a footprint of the platform assembly, the platform assembly including a collaborative manipulator controller;
    a collaborative manipulator mounted to a support plate of the frame, the collaborative manipulator having an arm and a gripper at a distal end of the arm being operated to manipulate parts, the collaborative manipulator being operably coupled to the collaborative manipulator controller for controlling operation of the collaborative manipulator, the collaborative manipulator movable from a home position to an extended position, the arm being located within the footprint of the frame of the platform assembly in the home position, the gripper being located adjacent the support plate in the home position, the gripper being located remote from the support plate in the extended position; and a safety sensor determining when the gripper is located at the home position relative to the frame and determining when the gripper is located in the extended position, wherein the safety sensor includes a first proximity sensor fixed relative to the support plate remote from the collaborative manipulator at a home position at the top of the frame within the footprint and a second proximity sensor coupled to the collaborative manipulator proximate to the distal end and movable with the collaborative manipulator, the second proximity sensor being movable relative to the first proximity sensor, the safety sensor determining when the gripper is located at the home position relative to the frame within the footprint proximate to the support plate by detecting the second proximity sensor in proximity to the frame by determining that the second proximity sensor is in proximity to the first proximity sensor, which is fixed to the frame at the home position.

12. The autonomous mobile vehicle of claim 11, wherein presence of the second proximity sensor is detected when the gripper is in the home position, and wherein the second proximity sensor is undetected by the first proximity sensor when the gripper is in the extended position.

13. The autonomous mobile vehicle of claim 11, wherein the AGV and the collaborative manipulator are shut down if the AGV is moving and the gripper is not detected in the home position by the safety sensor.

14. The autonomous mobile vehicle of claim 11, wherein the collaborative manipulator is in a safe position when the gripper is detected by the safety sensor in the home position, the collaborative manipulator being in an unsafe position when the gripper is undetected by the safety sensor, wherein the AGV is inoperable when the collaborative manipulator is in the unsafe position.

15. The autonomous mobile vehicle of claim 11, wherein the collaborative manipulator is in a safe position when the gripper is detected by the safety sensor in the home position, the collaborative manipulator being in an unsafe position when the gripper is undetected by the safety sensor, wherein the AGV controller determines if the AGV is moving, the AGV controller shutting down the AGV if the AGV is moving and the collaborative manipulator is in the unsafe position, the AGV allowing normal operation of the AGV if the AGV is moving and the collaborative manipulator is in the safe position, the AGV controller allowing normal operation of the AGV if the AGV is stationary and the collaborative manipulator controller allowing normal operation of the collaborative manipulator if the AGV is stationary.

16. A method of operating an autonomous mobile vehicle including an automatic guided vehicle (AGV), a platform assembly having sides extending between a top and a bottom defining a footprint coupled to the AGV, a collaborative manipulator coupled to the platform assembly, and a safety sensor sensing a proximity of the collaborative manipulator relative to the platform assembly, wherein the safety sensor includes a first proximity sensor fixed relative to a support plate of the platform assembly remote from the collaborative manipulator at a home position at the top of the frame within the footprint and a second proximity sensor coupled to the collaborative manipulator proximate to the distal end and movable with the collaborative manipulator, the method comprising:

determining if the AGV is moving or stationary;

determining if the collaborative manipulator is in a safe position or an unsafe position using the safety sensor by determining if the gripper at the distal end of the movable arm is at the home position relative to the frame proximate to the support plate within the footprint and thus in a safe position or if the gripper at the distal end of the movable arm is away from the home position relative to the frame remote from the support plate outside of the footprint and thus in an unsafe position by detecting if the second proximity sensor on the collaborative manipulator is in proximity to the frame by determining whether or not the second proximity sensor is in proximity to the first proximity sensor fixed relative to the support plate and the frame of the platform assembly at the home position;

operating the autonomous mobile vehicle in a safe mode if the AGV is stationary and the collaborative manipulator is in the safe position;

operating the autonomous mobile vehicle in the safe mode if the AGV is stationary and the collaborative manipulator is in the unsafe position; and operating the autonomous mobile vehicle in a safe mode if the AGV is moving and the collaborative manipulator is in the safe position;

operating the autonomous mobile vehicle in an unsafe mode if the AGV is moving and the collaborative manipulator is in the unsafe position, wherein the AGV is inoperable in the unsafe mode and wherein the collaborative manipulator is inoperable in the unsafe mode.

17. The method of claim 16, wherein said determining if the collaborative manipulator is in the safe position or the unsafe position comprises detecting proximity of a gripper of the collaborative manipulator to the safety sensor.

18. The method of claim 16, wherein said determining if the collaborative manipulator is in the safe position or the unsafe position comprises determining if an arm of the collaborative manipulator and a gripper of the collaborative manipulator is within the footprint of the platform assembly.

19. The method of claim 16, further comprising manually resetting the collaborative manipulator and the AGV after the autonomous mobile vehicle is in the unsafe mode.

20. The method of claim 16, wherein said operating the autonomous mobile vehicle in the unsafe mode comprises shutting off the AGV such that the AGV is stationary and shutting off the collaborative manipulator such that the collaborative manipulator is stationary.

* * * * *